United States Patent [19]

Dreyfus

[11] 4,047,125
[45] Sept. 6, 1977

[54] ELECTRON BEAM PUMPED GAS LASER

[75] Inventor: Russell Warren Dreyfus, Cross River, N.Y.

[73] Assignee: International Business Machines Corporation, Armonk, N.Y.

[21] Appl. No.: 682,865

[22] Filed: May 3, 1976

[51] Int. Cl.[2] .............................................. H01S 3/09
[52] U.S. Cl. ........................ 331/94.5 PE; 331/94.5 G
[58] Field of Search ................. 331/94.5 G, 94.5 PE, 331/94.5 D; 315/111.8, 111.9, 150; 330/4.3

[56] References Cited
PUBLICATIONS

Crocker et al., Electronics Letters, vol. 8, No. 18, Sept. 7, 1972, pp. 460-461.

Primary Examiner—William L. Sikes
Assistant Examiner—Marcus S. Rasco
Attorney, Agent, or Firm—Pollock, Vande Sande & Priddy

[57] ABSTRACT

An electron beam pumped gas laser includes an evacuated cavity adapted to house a lasing gas and an electron beam launching means (such as a field emission diode). Means are provided to insert a lasing gas into the cavity so as to produce a traveling density discontinuity. The diode is energized prior to the time the traveling density discontinuity reaches it so as to launch an electron beam under substantially evacuated conditions. The principles of the invention can also be applied to gaseous electron beam transport.

18 Claims, 5 Drawing Figures

ELECTRON BEAM PUMPED GAS LASER

FIELD OF THE INVENTION

The present invention relates to electron beam pumped gas lasers and more particularly to such a device which eliminates the previous requirement for physical apparatus to segregate the electron beam launching means from the lasing gas.

BACKGROUND OF THE INVENTION

Electron beam pumped gas lasers are known in the art, see "Electron-Beam Excitation of the Nitrogen Laser" by Dreyfus and Hodgson, *Appl. Phys. Let.*, Volume 20, No. 5, March 1972, pages 195-197 and "Relativistic Electron-Beam Pumped uv Gas Lasers" by the same authors in *J. Vac. Sci. Technol.*, Volume 10, No. 6, November/December 1973, pages 1033-36. These devices include a field-emission diode to launch an electron beam for pumping purposes. Usually this requires a static pressure, in the diode of $\leq 0.1$ Torr. On the other hand, to excite the gas to a lasing state, static gas pressures in the range of 4-45 Torr appears to be most desirable. These conflicting requirements have been satisfied, typically, by including a thin metal foil to separate the electron-beam launching device from the lasing gas. In this fashion, static gas-pressure differentials were maintained.

The thin metal foil, however, introduces a number of problems, some of which are summarized below:

1. The foil lifetime is usually limited to < 1000 operations and sometimes only one.
2. An electron beam exiting from the foil is not well collimated, a typical one mil foil produces a beam of angular spread on the order of 30°.
3. Current densities are limited by damage to the foil whereas high current densities are desirable to promote self-magnetic or electrostatic field focussing and more efficient energy transfer via non-linear interactions.
4. Use of the foil required high voltage diode operations (>200 KeV) since the beam has to traverse the foil whereas low energy beams (i.e., < 100 KeV) would be simpler to generate.
5. Relatively low efficiency due to the difficulty of extracting energy from a high energy beam.
6. The difficulty in handling corrosive gases (such as xenon and fluorine mixtures) since these tend to destroy the foil.

Devices other than lasers employ electron beams traveling in a gaseous environment. For example, under certain circumstances it is advantageous to transport an electron beam in a gaseous atmosphere. The electron beam ionizes at least some of the gas; the resulting electrons are expelled by the beam, while the positive ions help to maintain the beam in an integral condition. In the past, the electron beam was coupled into the gaseous atmosphere through a thin metal foil or the equivalent. By employing the principles of the present invention, this foil also can be eliminated with concomitant advantages.

If is, therefore, one object of the present invention to eliminate the necessity for this foil, or other physical apparatus to segregate the electron beam launching means from the gas while at the same time providing for emission of the beam and sufficient gas density for lasing and/or transport. It is another object of the present invention to meet the foregoing objects by introducing a gas density discontinuity in an evacuated cavity which also includes an electron beam launching means, and energizing the electron beam launching means at a time when two regions exist in the cavity, a first region immediately adjacent to the electron beam launching means which is in a substantially evacuated condition, and a second region which includes sufficient quantities of gas to support effective lasing operation.

It is another object of the present invention to provide for effective launching of electron-beams into a gas filled region of a cavity without providing apparatus to physically segregate the gas filled region from the region wherein the electron beam is launched.

It is a further object of the invention to provide for two regions in a cavity including an electron beam launching means and for energizing the beam launching means when the region surrounding the same is in a substantially evacuated condition at the same time the other region has substantial gas densities therein.

SUMMARY OF THE INVENTION

The present invention allows elimination of the metal foil or equivalent apparatus and at the same time satisfies the physical requirements which, it was previously believed, required the presence of the foil. Namely, the electron beam launching means operates in a substantially evacuated environment while at the same time the electron beam passes through a gaseous atmosphere. If the gaseous atmosphere is a lasing gas, lasing can occur in response to the pumping by the electron beam. On the other hand, the atmosphere may be only that required for effective transport of the electron beam in which case some ionization would occur to help maintain the beam in an integral condition. One embodiment the present invention contemplates a reservoir of a lasing gas which is connected by a switchable device, such as an electrically operated valve, to an evacuated cavity adapted to house the lasing gas and an electron beam launching means. The switchable means is enabled to allow the lasing gas to flow into the evacuated cavity producing a density discontinuity. The electron beam launching means is energized when there are substantially two regions in the cavity, one region immediately adjacent to the electron beam launching means which is in a relatively evacuated condition, and another region which has sufficient quantities of gas therein to support effective lasing action. Energization of the electron beam launching means produces an electron beam for pumping the lasing gas. In a relatively short period of time lasing operation occurs. Preferably means are provided to then evacuate the cavity so that another cycle of operation can occur.

BRIEF DESCRIPTION OF THE DRAWINGS

The present invention will now be described in conjunction with the attached drawings in which identical apparatus is identified by like reference numerals, and in which.

DETAILED DESCRIPTION OF THE INVENTION

Figure 1:
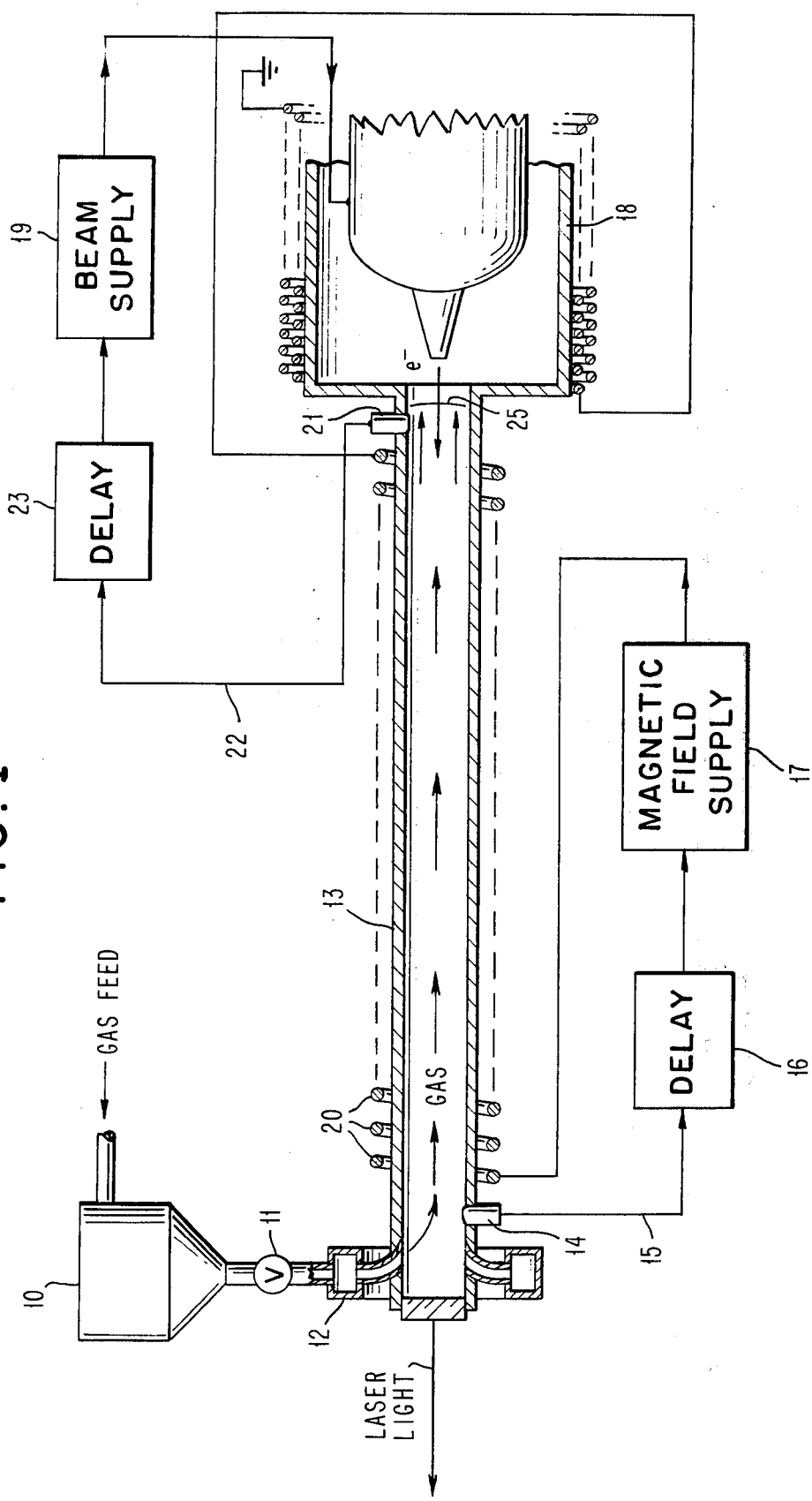
FIG. 1 is a part cross-section part block diagram of one embodiment of the invention.

FIG. 1 is a part cross-section, part block diagram illustrating one embodiment of the present invention. In FIG. 1 a gas feed supply is connected to a gas reservoir 10. Reservoir 10 has a port connected to an electrically operated valve 11, whose other port is connected to a plenum chamber 12. Plenum chamber 12 is connected at one end of a cavity 13 which is normally evacuated but which is adapted to house the lasing gas supplied by the feed, through reservoir 10, valve 11 and plenum 12. Cavity 13 can have any appropriate geometry, such as cylindrical. Preferably the cavity is formed so as to provide for a return current path for the current introduced by the electron beam launching device (referred to hereinafter). Although the return current can flow only in the gas, preferably the cavity is formed of a conducting material, such as metal, or with a conducting lining, such as a metal screen, inside a glass or equivalent material. At the same end of cavity 13 connected to the plenum chamber 12, a pressure transducer 14 is also connected. At the opposite end of the cavity 13 an electron beam launching device 18 is provided. This may comprise a field emission diode with dielectric rod cathode of graphite or glass with a 1–2 mm tip and energized by beam supply 19. For example, the beam supply can be a Marx bank high voltage pulser coupled through a Blumlein pulse shaper to the cathode as exemplified by a Febetron No. 706, Field Emission Corp., McMinneville, Oregon. A solenoid 20 surrounds both the cavity 13 as well as the electron beam launching device 18. A vacuum transducer 21 is connected in the cavity 13 slightly in advance of the electron beam launching device 18 (for example, 18 cm in one embodiment).

A signal delay 16 is electrically connected, over conductor 15, to the pressure transducer 14 and to a magnetic field supply 17. Delay 16 is provided to energize the magnetic field supply 17 in response to a signal which originates at the pressure transducer 14. Vacuum transducer 21 is connected, over conductor 22, to a signal delay 23 which is adapted to trigger the beam supply 19 so as to energize the electron beam launching device 18. The valve 11 is chosen so that it can completely open in less time than that required for the gas to flow down the cavity 13. In one embodiment of invention (in which cavity 13 was 2m in length and the gas traveled at $10^4$ to $2 \times 10^5$ cm/sec) this time was less than 20 msec and the valve should be able to open in less than 3 msec. Improvement in operation could be expected if this time was reduced to less than 1 msec.

In operation, the cavity 13 is evacuated to suitable vacuum, such as less than or equal to 1 m Torr and beam supply 19 and magnetic field supply 17 are charged to operating potentials. Reservoir 10 is charged to a suitable pressure so that when valve 11 is opened lasing gas begins flowing into the previously evacuated cavity 13. The cycle of operation is begun by opening the valve 11 by any suitable means, such as an external electrical signal. As gas flows into cavity 13, at the leading edge of this gas a density change or pressure pulse is detected by the pressure transducer 14. The resulting electrical signal energizes delay 16. The gas rapidly flows into the tube and preferably there is a gas density discontinuity 25 (this can be likened to a shock wave), which travels down the cavity 13 toward the electron beam launching device 18. Preferably, the gas density conditions on either side of the discontinuity are sufficient to meet the differing requirements, that is, on the electron beam launching device side of the discontinuity gas density is such that the gas pressure is less than 0.03 Torr, while on the supply side the density is $10^{17}$ mol/cm$^3$ or higher. These conditions can be met by properly selecting reservoir pressure, gas conductivity of valve 11 and plenum 12 and the diameter of the cavity 13. The gas density discontinuity travels down the cavity at approximately $10^4$ to $2 \times 10^5$ cm/sec and varies inversely with the molecular weight of the gas. In the following discussion, times and delay times will be referred to operation with nitrogen gas, one skilled in the art can see how adjustments must be made for the higher velocity of, say, hydrogen. Delay 16 is selected so that approximately 2 milliseconds before the gas density discontinuity reaches the region of electron beam launching device, the magnetic field supply 17 is energized so that the magnetic field surrounding cavity 13 reaches an appropriate value in approximately 2 milliseconds. As the gas density discontinuity travels down the cavity 13, it is detected by vacuum transducer 21 which provides an electrical signal, over conductor 22, to a delay 23. After an appropriate delay the beam supply 19 is energized for launching an electron beam into the cavity 13. The exact delay used will determine how close the density discontinuity is to the cathode; in other words, this delay has a bearing on gas density at the cathode. To simulate the prior art one would attempt to energize the cathode before substantially any gas reaches it since, the prior art foil was effective to prevent the gas from reaching the cathode. I have found, however, that to optimize the operation of the laser some gas should be allowed to reach the cathode. Allowing increased gas density at the cathode, when it is energized, serves to increase the beam current, however, if the gas density is too high the cathode sees a very low impedance, the electrons have low energy and arcing may occur.

To quantify the foregoing, consider a cathode (whose impedance is highly geometry dependent) with a 50 ohm impedance (or an impedance in the range of 40–70 ohms). Such a cathode would, with prior art techniques, conventionally be used with a generator (or power supply) of about 30 ohm output impedance. I have found that optimum performance can be obtained by refraining from energizing the cathode until sufficient gas is in the vicinity so that the cathode impedance has been reduced to about 30 ohms (or a range of 10–30 ohms). Although this is not essential to the invention, as was indicated above, the lower the gas density, at the time of cathode energization, the lower the beam current, while as the gas density is increased, at the time of cathode energization, the electrons have reduced energy, and arcing may occur. Therefore, I prefer to energize the cathode at a time when two regions of gas density exist in the cavity, a first region of substantial (i.e., at least $10^{17}$mol/cm$^3$) density and another region which is relatively evacuated compared to the first region but which has sufficient gas density to reduce the cathode impedance below vacuum conditions.

To determine just what delay will produce this result can best be determined empirically. For example, the e-beam may actually be fired under varying delays and measurements made of cathode impedance or some output quantity such as beam current or laser light output. Since the gas density gradient may vary as well as the desired gas density at the time the diode is fired, it is within the scope of the invention to fire the diode at or prior to the time the gas density discontinuity reaches the cathode but before the gas density has increased to such a level that would result in arcing.

Figure 2A:
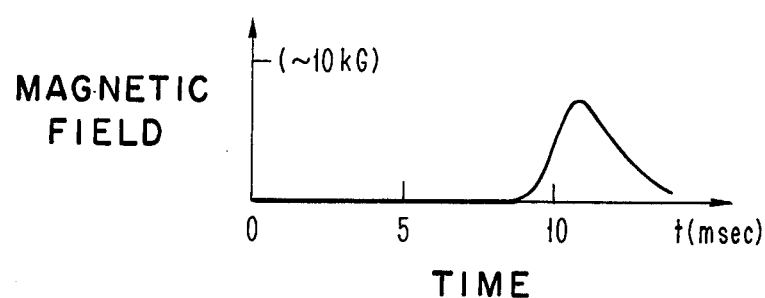
FIGS. 2A, 2B and 2C are timing diagrams relating energization of a guide magnetic field and a field emission diode to the location of a traveling density discontinuity.
Figure 2B:
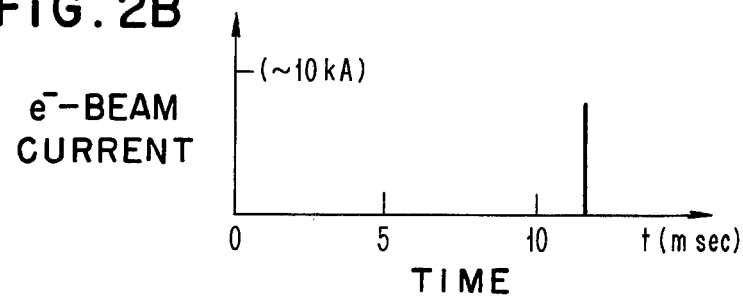
Figure 2C:
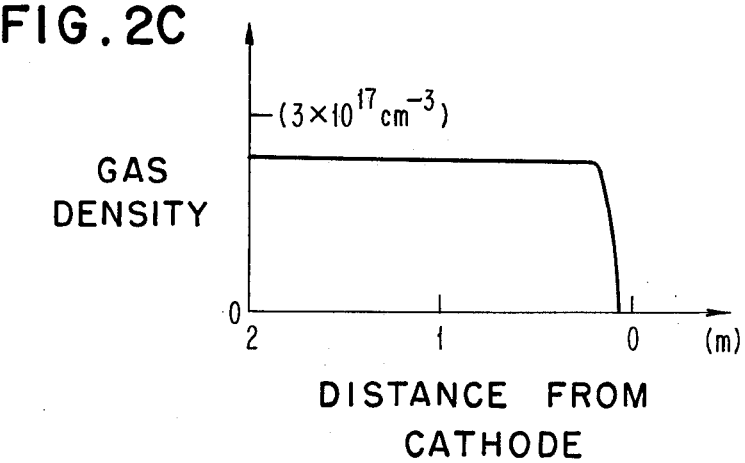

To illustrate the temporal sequence of events reference is now made to FIGS. 2A, 2B and 2C which show respectively, the magnetic field and electron beam current, as a function of time beginning at the introduction of gas into the cavity 13, and gas distribution in the cavity 13 as a function of distance from the electron beam launching device 18. More particularly, as is shown in FIG. 2A, the combined effects of the delay 16 and the rise time of the magnetic field result in the magnetic field having a form such as there illustrated. FIG. 2B illustrates energization of the electron beam approximately at the same time that the magnetic field peaks. Although the electron beam is on for approximately 2-30 nanoseconds, on the time scale of FIG. 2B, it appears to be a simple impulse.

FIG. 2C illustrates that the gas density discontinuity approaches the electron beam launching device at the time that the electron beam is fired. In this fashion, the gas density adjacent the electron beam launching device is only slightly greater than that of an evacuated chamber, whereas, on the other side of the gas density discontinuity, sufficient gas density (about $3 \times 10^{17}/cm^3$) is provided for effective lasing operation. Typical parameters are 300 KeV on the electron beam launching device cathode, producing a current on the order of 10 kiloamps with a pulse duration of 2-30 nanoseconds. In one embodiment of the invention the lasing gas was nitrogen supplied at a pressure of 380 Torr with the gas reservoir volume of 20 cubic centimeters. Transducer 14 is a piezoelectric pressure transducer and transducer 21 is a Philips vacuum gauge. Operation resulted in a 300 kw output pulse of approximately 5 nanoseconds duration at 3371°A. The electron beam propagates down cavity 13 in approximately 10 nanoseconds. As a result, the gas density discontinuity appears stationary in relation to travel of the electron beam. The beam propagates the length of cavity 13 due to a combination of guide magnetic field, self-magnetic field, self-electrostatic field and metal wall repulsive forces. As the electron beam passes through the gas, both direct electron-gas collisions and cooperative phenomena produce excited atomic, ionic or molecular states which exhibit laser action, i.e., light amplification by stimulated emission.

Figure 3:
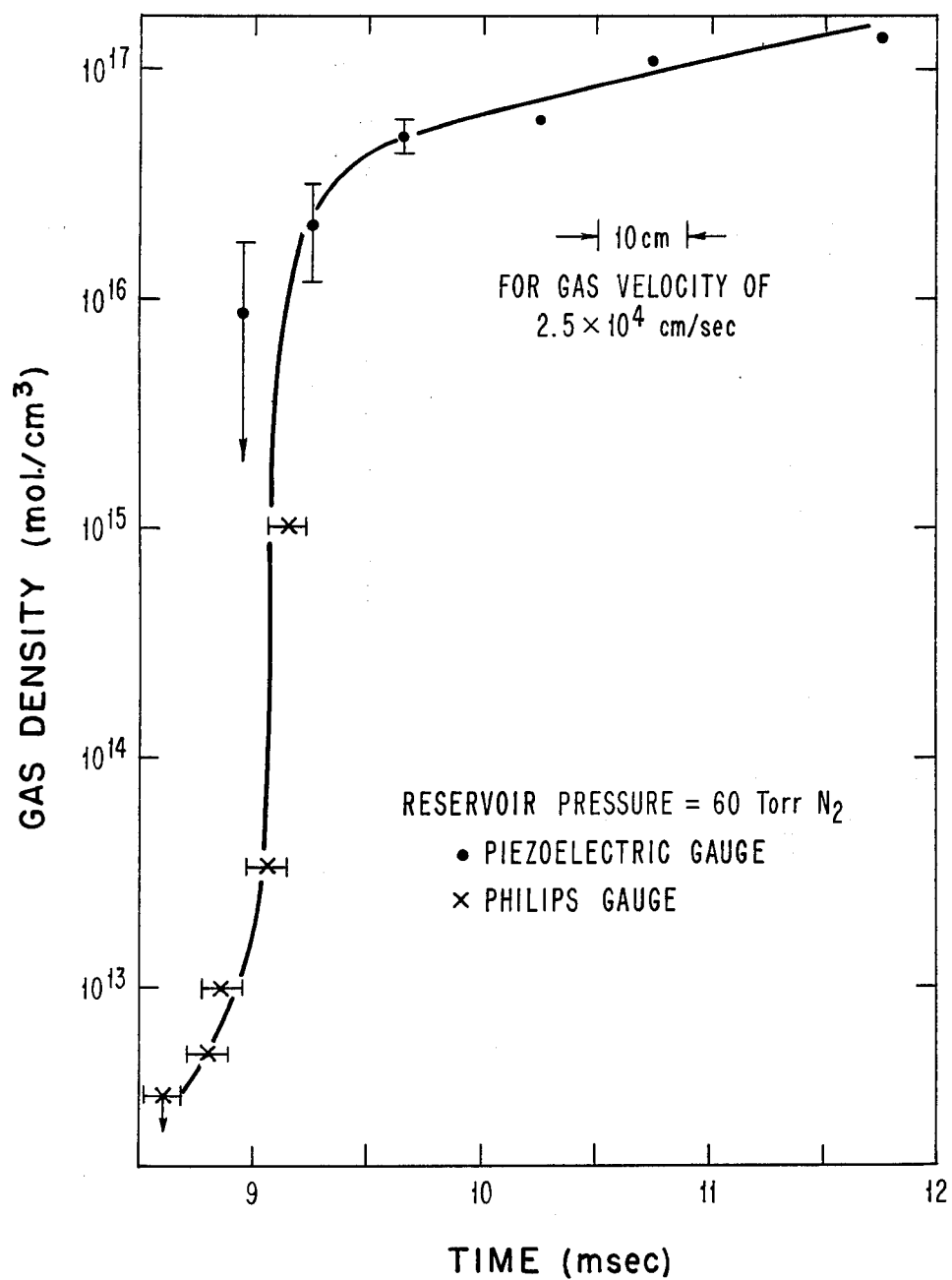
FIG. 3 is a graph of density vs. time at the cathode end of a cavity.

In this description the gas densities on either side of the density discontinuity are referred to, rather than pressure. Since the gas is commonly not in thermodynamic equilibrium and the effective temperature may be lower than ambient, pressures are not as meaningful as density. Rather, FIG. 3 shows measured gas density as a function of time at the end of cavity 13 housing the electron-beam launching means. For this curve two piezoelectric transducers were used, one to establish t=o and the second adjacent transducer 21 (see FIG. 1). For the electron beam launching device employed, i.e., a field emission diode the maximum satisfactory gas density is about $10^{15}$ mol/cm³. As can be seen in FIG. 3 this occurs in a region of large density gradient simulating a well defined anode plane. Near the gas outlet density was essentially constant at $5 \times 10^{17}$ msl/cm³ for $4 < t < 13$ msec. The leading edge of the gas density discontinuity shows a large gradient at $t = 9.1$ msec even though at $t = 9.0$ msec the density is $< 3 \times 10^{13}$ mol/cm³ which is sufficiently small to consider it as evacuated. The present values show density increases of $10^3$ times in a distance of less than 2.5 cm. Thus, the electron beam can be fired before the discontinuity reaches the launching device at a time when the vast majority of cavity 13 has sufficient gas density for lasing action while, at the same time, the region surrounding the electron beam launching device has such small gas density that it is in a substantially evacuated condition.

One significant factor in laser operating characteristics is the repetition rate. To provide for a high repetition rate in the device of FIG. 1 it is preferable to quickly evacuate cavity 13 after lasing occurs. To this end a high thruput pumping system can be added to the cavity. With such apparatus the gas need remain in the cavity for period less than 1 sec. This feature is particularly useful when corrosive gases are to be employed. Of course, those skilled in the art can readily perceive of other apparatus to automatically evacuate cavity 13 after lasing occurs.

Those skilled in the art can readily understand that a variety of changes and modifications can be made to the embodiment herein disclosed. For example, gases other than nitrogen can obviously be utilized for outputs of different wavelengths. For instance, hydrogen, xenon plus fluorine, carbon dioxide, carbon monoxide or one of the noble gases. One or both of the transducers 14 and 21 can be omitted. For example, transducer 14 can be eliminated and a signal derived from valve 11 can be connected to delay 16. Transducer 21 can be omitted and a signal from valve 11, suitably delayed can trigger the beam supply 19. Cavity 13 may be of circular cross-section although that shape is not essential, other shapes such as elliptical and even rectangular may be used, if desirable. As a further alternative transducer 21 may be replaced by an optical interferometer or spark gap to accurately locate the density discontinuity with respect to electron beam launching means 18. Time delays 16 or 23 can be eliminated by varying the positions of the pressure transducers so that they are activated by the flowing gas at later times (i.e., placed further downstream than in the above description).

The essential characteristics of the invention include a normally evacuated cavity and an electron beam launching means housed in the cavity, a lasing gas supply and a switchable means to introduce the gas into the cavity in such a way that a density discontinuity is created in the tube. The electron beam launching means is energized to launch an electron beam at or prior to the time the density discontinuity reaches it, or in other words, when two distinct regions exist in the cavity, the first region which is substantially evacuated, and the second region, on the other side of the density discontinuity, which has sufficient gas density to support lasing action.

Clearly, proper temporal sequences must be maintained, that is, an electron beam launching means must be energized at a time prior to the time the density discontinuity completely fills the cavity. There are a number of ways in which this can be effected. One way is, of course, illustrated in FIG. 1. However, that figure includes a magnetic field supply to supply a guiding magnetic field. Those skilled in the art will understand that the magnetic field can be dispensed with entirely under certain conditions, or it can be made steady state such that no timing requirements are imposed. Alternatively, for instance, the density discontinuity can be sensed at any point in the cavity, and knowing the velocity of the discontinuity, a signal can be developed for energizing the electron beam launching means. On the other hand, a signal for energizing the electron beam launching means can be derived from the signal that operates the valve 11, suitably delayed.

Those skilled in the art will recognize that the laser herein disclosed is what is termed a "super-radiant" laser in that no resonant optical cavity, such as that contained between a pair of mirrors, is provided. Rather, sufficient light amplification by stimulated emission is provided without requiring the light beam to build up in a number of passes of the laser. However, the present invention is not necessarily confined to "super-radiant" lasers, and, if desired, mirrors can be employed.

Another aspect of the invention is not concerned with lasers. Rather, it is concerned with the field of electron beam transport. Briefly, workers in the field of high density electron beams have found that maintaining the beam integral can be aided by transporting the beam through a gaseous atmosphere which may be ionized by the beam to counteract the space charge of the beam itself, and thus provide a guiding function. Those devices, however, in common with the prior electron beam pumped lasers, have provided a physical device to separate the diode or electron beam launching device, from the transporting region which included the gaseous medium, for reasons explained above. The separation mechanism normally employed was a thin metallic foil and many of the disadvantages mentioned in the beginning of this description apply to the electron beam transport field as well. In particular, the foil was prone to rupture, decreased the beam energy passing therethrough, causing scattering of the beam, etc. This foil can also be eliminated by providing a gas density discontinuity in a cavity through which an electron beam is projected. In such embodiment, however, the gas introduced need not be a lasing gas.

What is claimed is:

1. An electron beam pumped gas laser having an electron beam launching means in an evacuated cavity which is adapted to house a lasing gas which laser eliminates the requirement for apparatus to physically segregate the electron beam launching means from the lasing gas, which laser further comprises:
   a reservoir of lasing gas, valve means connecting said cavity to said reservoir to allow said lasing gas to flow into said evacuated cavity, and
   means to energize said electron beam launching means at a time when two distinct regions exist in said cavity, a first region immediately surrounding said electron beam launching means which is substantially evacuated and a second region containing a quantity of gas sufficient to support lasing action when pumped by an electron beam passing therethrough.

2. The laser of claim 1 in which said means to energize said electron beam includes sensing means mounted in said cavity for sensing a density discontinuity as said lasing gas flows into said cavity.

3. The device of said claim 1 wherein said lasing gas is selected from the group of nitrogen, hydrogen, carbon monoxide, carbon dioxide and the noble gases.

4. The device of claim 1 wherein said means energizes said electron beam launching means when said lasing gas has reduced the impedance of said launching means below vacuum conditions.

5. An electron beam pumped gas laser having an evacuated cavity adapted to house a lasing gas with an electron beam launching means therein and a supply of lasing gas, which laser eliminates the requirement for means to segregate said electron beam launching means from said lasing gas, wherein the improvement comprises:
   a switchable means connecting said gas supply to said cavity to, when operated, allow said gas to flow into said evacuated cavity to produce a traveling gas density discontinuity, and
   means to energize said electron beam launching means when said gas density discontinuity reaches a predetermined location with respect to said electron beam launching means.

6. The laser of claim 5 wherein said means to energize said electron beam launching means is responsive to a signal developed by said switchable means.

7. The device of claim 5 wherein said means to energize said electron beam launching means includes sensing means to sense the passage of said gas density discontinuity and delay means to energize said electron beam launching means a predetermined time after sensing said gas density discontinuity.

8. The laser of claim 5 wherein said lasing gas is selected from the group of nitrogen, hydrogen, carbon monoxide, carbon dioxide and the noble gases.

9. The laser of claim 5 which includes a magnetic guide field generating means to produce a magnetic field to guide said electron beam.

10. The laser of claim 9 in which said guide field generating means is switched on in response to detection of said gas flowing into said cavity.

11. The laser of claim 5 wherein said means energizes said launching means prior to the time said gas density discontinuity reaches said launching means.

12. The laser of claim 5 wherein said means energizes said launching means at the time said gas density discontinuity reaches said launching means.

13. The laser of claim 5 wherein said means energizes said launching means when said gas density discontinuity is sufficiently close to said launching means to reduce the impedance thereof as compared to vacuum conditions.

14. A device for transporting an electron beam in a gaseous atmosphere which eliminates the requirement for apparatus to physically segregate an electron beam launching means from said gaseous atmosphere, which comprises:
   an evacuated cavity adapted to house a gaseous atmosphere and an electron beam launching means therein,
   a reservoir of gas,
   valve means connecting said cavity to said reservoir to allow said gas to flow into said evacuated cavity to produce a density discontinuity,
   means to energize said electron beam launching means at a time when two distinct regions exist in said cavity, a first region immediately surrounding said electron beam launching means which is substantially evacuated and a second region containing a quantity of gas therein to assist in integral transport of an electron beam.

15. The device of claim 14 which further includes sensing means mounted in said cavity for sensing said density discontinuity included in said means for energizing.

16. The device of claim 14 in which said means to energize operates when said gas has reduced the impedance of said electron beam launching means below vacuum conditions.

17. The device of claim 14 in which said means to energize operates prior to the time said density discontinuity reaches said electron beam launching means.

18. The device of claim 14 in which said means to energize operates at the time said density discontinuity reaches said electron beam launching means.

* * * * *

UNITED STATES PATENT AND TRADEMARK OFFICE
CERTIFICATE OF CORRECTION

PATENT NO. : 4,047,125
DATED : September 6, 1977
INVENTOR(S) : Dreyfus

It is certified that error appears in the above—identified patent and that said Letters Patent are hereby corrected as shown below:

In column 1, line 61, change "If" to --It--.

In column 4, line 34, change "isenergized" to --is energized--.

In column 5, line 24, the phrase should read -- $3 \times 10^{17}$ mol/cm$^3$--.

Column 5, line 62 should read -- $5 \times 10^{17}$ mol/cm$^3$ --

In column 6, line 13, change "period" to --periods--.

Signed and Sealed this

Fourth Day of April 1978

[SEAL]

Attest:

RUTH C. MASON
Attesting Officer

LUTRELLE F. PARKER
Acting Commissioner of Patents and Trademarks